United States Patent
Kim

(10) Patent No.: US 8,592,088 B2
(45) Date of Patent: Nov. 26, 2013

(54) ELECTRODE ASSEMBLY WITH POROUS CERAMIC LAYER AND SECONDARY BATTERY WITH THE SAME

(75) Inventor: Jinhee Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 845 days.

(21) Appl. No.: 12/003,848

(22) Filed: Jan. 2, 2008

(65) Prior Publication Data

US 2008/0220327 A1    Sep. 11, 2008

(30) Foreign Application Priority Data

Jan. 3, 2007 (KR) .................. 10-2007-0000619

(51) Int. Cl.
*H01M 2/16*    (2006.01)

(52) U.S. Cl.
USPC ........... 429/251; 429/247; 429/249; 429/252; 429/254

(58) Field of Classification Search
USPC .................. 429/164, 247, 249, 251, 252, 254
See application file for complete search history.

(56) References Cited

U.S. PATENT DOCUMENTS

| | | | |
|---|---|---|---|
| 2003/0035943 A1* | 2/2003 | Jones et al. | 428/317.9 |
| 2005/0221192 A1 | 10/2005 | Hennige et al. | |
| 2006/0024569 A1* | 2/2006 | Hennige et al. | 429/144 |
| 2006/0078791 A1 | 4/2006 | Hennige et al. | |
| 2008/0187825 A1* | 8/2008 | Kawabata et al. | 429/144 |
| 2009/0155678 A1* | 6/2009 | Less et al. | 429/144 |

FOREIGN PATENT DOCUMENTS

| | | |
|---|---|---|
| KR | 10-2006-0033029 | 4/2006 |
| KR | 2006-0112822 | 11/2006 |
| KR | 2006132556 A * | 12/2006 |
| WO | WO 2005/098997 | 10/2005 |

OTHER PUBLICATIONS

Machine translation of KR2006132556 A, Abe et al., Dec. 2006.*
Earle, The Electrical Conductivity of Titanium Dioxide, Jan. 1942, Physical Review, 61, 56-62.*
Carbopol 980 Polymer. Lubrizol.com Lubrizol. http://www.lubrizol.com/PersonalCare/Products/Carbopol/Carbopol980.html (accessed: Jun. 29, 2010).*
Uniform. Dictionary.com. Dictionary.com Unabridged. Random House, Inc. http://dictionary.reference.com/browse/uniform (accessed: Jun. 29, 2010).*

* cited by examiner

*Primary Examiner* — Sean P Cullen
(74) *Attorney, Agent, or Firm* — Robert E. Bushnell, Esq.

(57) ABSTRACT

An electrode assembly for a battery that can improve safety of the ceramic layer and increase lifetime capacity and high rate charge/discharge capacity and low temperature charge/discharge capacity of the electrode assembly. The electrode assembly having a porous ceramic layer coated on at least one surface of the positive electrode plate or the negative electrode plate to prevent an electrical short between the positive electrode plate and the negative electrode plate, where a main peak of pore size of the ceramic layer is in the range of 20 nm to 80 nm, and a secondary battery including the electrode assembly.

11 Claims, 2 Drawing Sheets
(1 of 2 Drawing Sheet(s) Filed in Color)

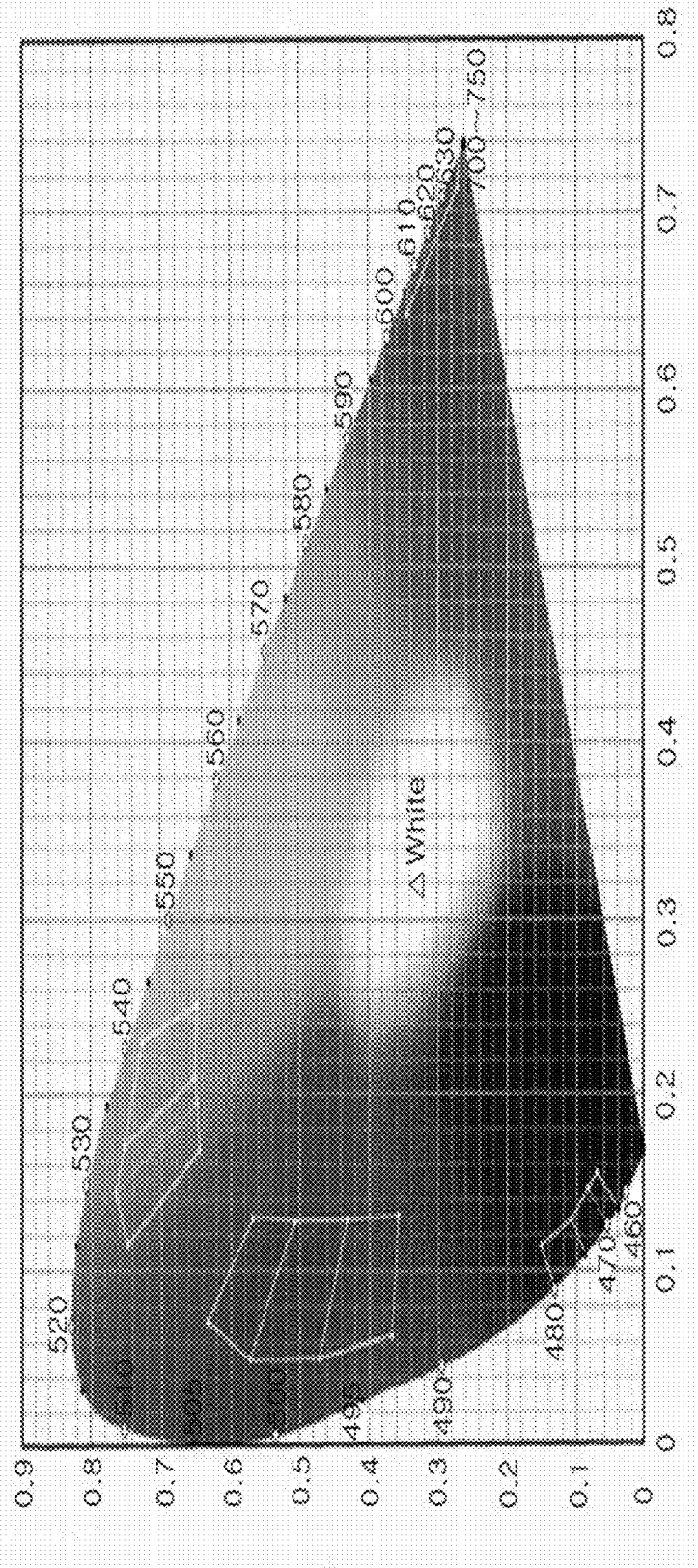

ELECTRODE ASSEMBLY WITH POROUS CERAMIC LAYER AND SECONDARY BATTERY WITH THE SAME

CLAIM OF PRIORITY

This application makes reference to, incorporates the same herein, and claims all benefits accruing under 35 U.S.C §119 from an application for Electrode Assembly and Secondary Battery with The Same earlier field in the Korean Intellectual Property Office on 3 Jan. 2007 and there duly assigned Serial No. 10-2007-0000619.

BACKGROUND OF THE INVENTION

1. Field of the Invention

The present invention relates to an electrode assembly and a secondary battery including the same, and more particularly, to an electrode assembly in which a separator formed of a ceramic layer is interposed between a positive electrode plate and a negative electrode plate and a secondary battery including the electrode assembly.

2. Description of the Related Art

Generally, a secondary battery can be used repeatedly if it is charged. The secondary battery has been used as a main power source of portable devices for communication, information processing and audio/video. Recently, the secondary battery has been rapidly developed because it has ultra-light weight, high energy density, a high output voltage, a low self-discharging rate, environment-friendliness and a long life as a power source.

The secondary battery is divided into a nickel-hydrogen (Ni-MH) battery and a lithium ion (Li-ion) battery according to electrode active material. Particularly, the lithium ion battery can be also divided into a lithium ion battery using a liquid electrolyte and a lithium ion polymer battery using a solid polymer electrolyte or lithium ion battery using a gel type electrolyte according to electrolyte type. Further, the lithium ion battery can be divided into various types such as a can type and a pouch type according to a shape of a container receiving an electrode assembly.

The lithium ion battery can implement an ultra-light battery because its energy density per weight is very higher than a disposable battery. An average voltage per a cell of the lithium ion battery is three times more than other secondary batteries such as a NiCad (Nickel-Cadmium) battery or a nickel-hydrogen battery. The self-discharging rate of the lithium ion battery is about ⅓ of that of the NiCad battery or the nickel-hydrogen battery. The lithium ion battery is environmentally-friendly because it does not use heavy metals such as cadmium (Cd) or mercury (Hg), and has an advantage in that it can be charged/discharged more than 1000 times under a normal condition. Accordingly, the lithium ion battery has been rapidly developed with the growth of an information and communication technology.

In a conventional secondary battery, a bare cell is formed by receiving an electrode assembly including a positive electrode plate, a negative electrode plate and a separator in a can made of aluminum or aluminum alloy, finishing an opening of an upper end of the can with a cap assembly, injecting electrolyte into the inside of the can and sealing the can. Because the can is made of aluminum or aluminum alloy, it has advantages in that it can be light-weighted by lightweight property of aluminum and does not corrode even when it is used for a long time under a high voltage.

The sealed unit bare cell is received in a separate hard pack with being connected to safety devices such as a PTC (positive temperature coefficient) device, a thermal fuse, a Protective Circuit Module (PCM) and other accessories. Or, its external shape may be formed by a mold made of hot melt resin.

The separator of the electrode assembly, which is an olefin type film separator, is installed between the positive electrode plate and the negative electrode plate in order to prevent an electrical short between two electrodes. However, when the separator existing between two electrodes does not have sufficient permeability and wettability, there is a problem that the separator restricts movement of lithium ions between two electrodes so that an electrical property of the battery is degraded.

Further, the olefin type separator functions as a safety device for preventing the battery from being overheated. However, in the case where the battery temperature is suddenly increased due to some reason, for example, external heat transfer, etc., the separator may be damaged by the battery temperature increased continuously for a predetermined time even though micro-pores of the separator are closed.

In addition, if capacity of the battery becomes higher by a high density active material layer and thus density of an electrode plate is increased, there is a problem that injecting speed of an electrolyte becomes low or the electrolyte is not injected by required amount because the electrolyte does not sink into the electrode plate.

When the battery is continuously charged/discharged, a by-product is produced by redox reaction between positive electrode and negative electrode active materials and the electrolyte and thus the electrolyte is continuously exhausted. Accordingly, if absolute amount of the electrolyte as a media for ion movement between the positive electrode and the negative electrode is not fulfilled, capacity of a cycle is decreased.

Additionally, when large current flows in the secondary battery in short time according to high capacity of the battery, there is a problem that possibility of the electrical short due to the separator damage is increased because the separator is continuously melted by previously generated heat, rather than the battery temperature being decreased by current shutdown even if micro-pores of the separator are closed.

According to a request for stably preventing the electrical short between the electrodes even under high temperature, the separator includes a ceramic layer including a porous membrane formed by combining ceramic filler particles with a heat-resistant binder.

The ceramic layer of the ceramic separator includes a plurality of pores. That is, a high rate charge/discharge property can be obtained by using ceramic powder of higher porosity than the conventional olefin type film separator. In addition, the ceramic layer rapidly absorbs the electrolyte. Accordingly, the injecting speed of the electrolyte is increased, thereby allowing productivity of the secondary battery to be improved.

However, size and distribution of the pore of the ceramic layer should be optimized. That is, lithium dendrite is easily educed between the pores if the size of the pore of the ceramic layer is too large. Thus, sub-reaction proceeds between the lithium and the electrolyte, and the battery is ignited or exploded due to heat and gas caused by the sub-reaction, thereby allowing safety of the battery to become worse.

On the other hand, if the size of the pore of the ceramic layer is too small, there is a problem that a lifetime or a high rate charge/discharge capacity or low temperature charge/discharge capacity are reduced because lithium ions cannot smoothly move.

SUMMARY OF THE INVENTION

Accordingly, an object of the present invention is to provide an electrode assembly including a ceramic layer and a secondary battery with the same that can improve safety of the ceramic layer and increase lifetime capacity and high rate charge/discharge capacity and low temperature charge/discharge capacity of the electrode assembly.

Additional advantages, objects and features of the invention will be set forth in part in the description which follows and in part will become apparent to those having ordinary skill in the art upon examination of the following or may be learned from practice of the invention.

According to an aspect of the present invention, there is provided an electrode assembly including a positive electrode plate and an negative electrode plate, which comprises: a ceramic layer coated on at least one of the positive electrode plate or the negative electrode plate to prevent an electrical short between the positive electrode plate and the negative electrode plate, wherein a main peak of pore size of the ceramic layer is in the range of 20 nm to 80 nm.

The maximum size of the pore of the ceramic layer may be less than 120 nm.

When the ceramic layer is measured by a spectrophotometer, a value of a color (chromaticity) coordinate x may be in the range of 0.2900 to 0.3050, and a value of color (chromaticity) coordinate y may be in the range of 0.3100 to 0.3300.

When the ceramic layer is measured by a spectrophotometer, a value of a reflectivity (reflectance) Y may be in the range of 40 to 60.

A surface of the ceramic layer may be embossed.

The surface of the ceramic layer may have any one of a slant line pattern, a lattice pattern, a lozenge pattern or a comb type pattern.

The ceramic layer may be formed by coating on the positive electrode plate or the negative electrode plate with a ceramic paste formed by mixing an inorganic oxide filler with a binder and a solvent.

The inorganic oxide filler may be a semiconductor filler having a band gap.

The binder may be an acrylate rubber group binder.

Thickness of the ceramic layer may be in the range of 1 $\mu m$ to 20 $\mu m$.

According to another aspect of the present invention, there is provided a secondary battery including an electrode assembly, a can and a cap assembly, which comprises a ceramic layer coated on at least one of two electrode plates included in the electrode assembly to prevent an electrical short between the two electrode plates, wherein a main peak of pore size of the ceramic layer is in the range of 20 nm to 80 nm.

The maximum size of the pore of the ceramic layer may be less than 120 nm.

A surface of the ceramic layer may be embossed so as to have any one of a slant line pattern, a lattice pattern, a lozenge pattern or a comb type pattern.

BRIEF DESCRIPTION OF THE DRAWINGS

The application file contains at least one drawing executed in color. Copies of this patent application publication with color drawing(s) will be provided by the Office upon request and payment of the necessary fees. A more complete appreciation of the invention and many of the attendant advantages thereof, will be readily apparent as the same becomes better understood by reference to the following detailed description when considered in conjunction with accompanying drawings in which like reference symbols indicate the same or similar components, wherein:

FIG. 3 is a color coordinate of x and y measured by a spectrophotometer.

DETAILED DESCRIPTION OF THE INVENTION

Figure 1:
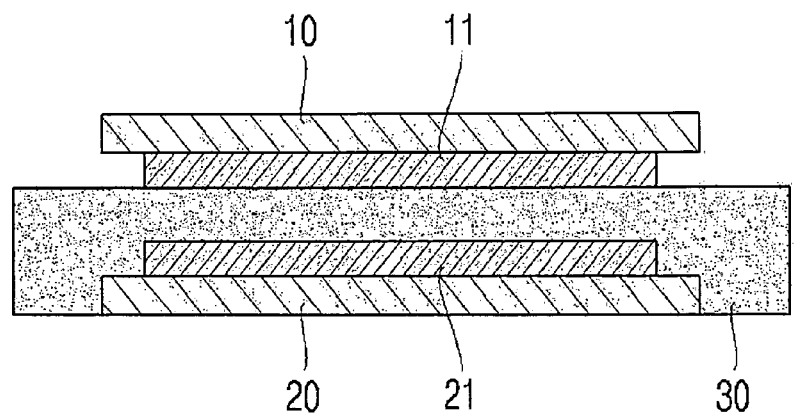
FIG. 1 is a partial sectional view illustrating an electrode assembly formed by stacking a positive electrode plate and a negative electrode plate according to one exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Referring to FIG. 1, an electrode assembly according to one exemplary embodiment of the present invention includes a positive electrode plate, a negative electrode plate, and a separator interposed between the positive electrode plate and the negative electrode plate for preventing an electrical short between the positive electrode plate and the negative electrode plate and enabling only lithium ions to be transferred, where the positive electrode plate, the separator and the negative electrode plate are laminated and wound.

The positive electrode plate includes a positive electrode collector 10, a positive electrode active material layer 11 and a positive electrode tap (not shown).

The positive electrode collector 10 is formed of thin aluminum foil. The positive electrode active material layer 11 consisted of lithium oxide as a main component is coated on both surfaces of the positive electrode collector 10. Further, a positive electrode non-coating portion, where the positive electrode active material layer 11 is not formed, is formed at both ends of the positive electrode current collector 10.

Lithium oxide such as $LiCoO_2$, $LiMn_2O_4$, $LiNiO_2$ and $LiMnO_2$, etc. is used for the positive electrode active material layer 11.

The positive electrode tap (not shown) is fixed at the positive electrode non-coating portion located at an inner circumference at the time of winding by ultrasonic welding or laser welding. The positive electrode tap (not shown) is formed of nickel metal, and is fixed so that its upper end is protruded above an upper end of the positive electrode collector 10.

The negative electrode plate includes a negative electrode collector 20, a negative electrode active material layer 21 and a negative electrode tap (not shown).

The negative electrode collector 20 is formed of thin copper foil, and the negative electrode active material layer 21 consisted of carbon materials as a main component is coated on both surfaces of the negative electrode collector 20. Further, a negative electrode non-coating portion, where the negative electrode active material layer 21 is not formed, is formed at both ends of the negative electrode current collector 20.

In this time, carbonic material (C), silicon, tin, tin oxide, composite tin alloys and transition metal oxide, etc. are used for the negative electrode active material.

The negative electrode tap (not shown) is formed of nickel metal and fixed at the negative electrode non-coating portion located at an inner circumference at the time of winding by ultrasonic welding. The negative electrode tap (not shown) is fixed so that its upper end is protruded above an upper end of the negative electrode collector 20.

The separator is formed of a ceramic layer 30, and the ceramic layer 30 is formed by coating a ceramic paste, which is made by mixing inorganic oxide filler, a binder and a solvent, on the negative electrode plate. As shown in FIG. 1, the ceramic layer 30 is formed by being coated on one surface of the negative electrode plate. On the other hand, the ceramic layer 30 may be formed by being coated only on each one surface of the positive electrode plate or the negative electrode plate, or on both surfaces of them.

The ceramic layer 30 has the same function as a conventional olefin film separator. The ceramic layer 30 prevents an electrical short between the positive electrode plate and the negative electrode plate because it has electrical insulating property and no electrical conductivity.

The ceramic layer 30 may be formed on the negative electrode plate by coating slurry of the negative electrode active material on a copper substrate, and drying and pressing it.

Next, the ceramic paste, which is made by mixing an inorganic oxide filler, a binder and a solvent, is coated on the negative electrode plate in thickness of 1 μm to 40 μm, particularly 1 μm to 20 μm, and dried so as to volatilize the solvent.

The inorganic oxide filler may be a semiconductor filler having a band gap, or may be formed of alumina ($Al_2O_3$), zirconia ($ZrO_2$), titan oxide ($TiO_2$) or silica ($SiO_2$).

The binder may be formed of polymer resin such as acrylate polymer or methacrylate polymer, which is one of acrylate rubber group, or their copolymers.

The inorganic oxide filler and the binder may be mixed with a ratio of 95 wt % to 5 wt % (weight percent).

Next, heat treatment is performed for polymerization of the binder so as to form the ceramic layer 30 on the negative electrode plate. A condition of the heat treatment may be a hot air drying or an IR drying.

The ceramic layer 30 coated on the negative electrode plate has high stability for the internal electrical short because a decomposition temperature of ceramic powders is more than 500° C. and a decomposition temperature of the binder is more than 250° C. The ceramic paste is not shrunk or melted at a high temperature because it is adhered by being coated on the electrode plate. Accordingly, because merely only an internal electrical shorted part is slightly damaged and nearby ceramic layer is not shrunk or melted, the electrical shorted part is not expanded.

In the case where the ceramic layer is overcharged, it continuously consumes the overcharged current by generating a soft short so as to maintain a constant voltage of 5V to 6 V and a constant temperature of less than 100° C., thereby improving safety for the overcharge.

Further, because the ceramic layer is highly porous due to the property of the ceramic powder, it rapidly absorbs the electrolyte so as to increase the injecting speed of the electrolyte and the electrolyte holding property. Accordingly, a lifetime and a high rate discharge property of the battery are improved.

On the other hand, an optimum pore size and pore distribution of the ceramic layer 30 are required to improve the safety of the battery.

Figure 2:
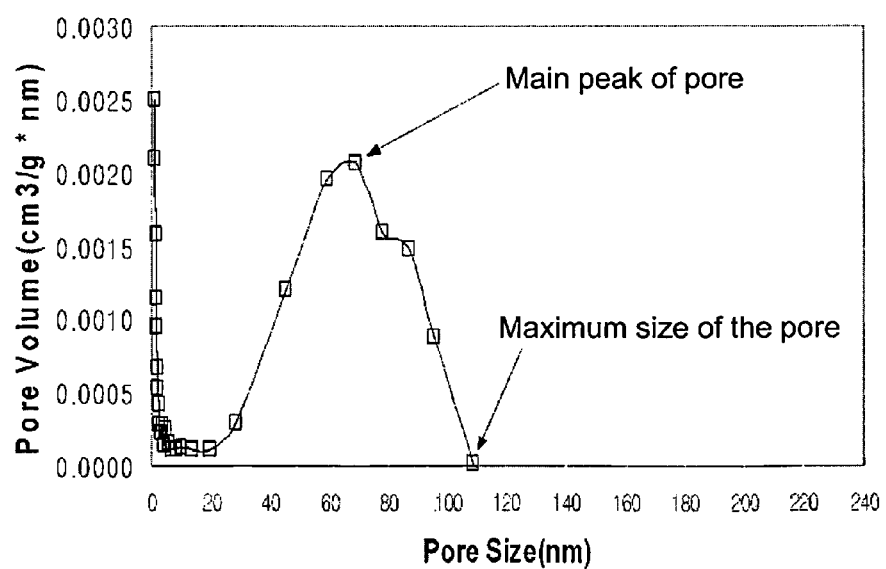
FIG. 2 is a graph illustrating distribution of pores, where X-axis indicates pore size and Y-axis indicates pore volume.

FIG. 2 is a graph illustrating distribution of pores, where X-axis indicates the pore size and Y-axis indicates the pore volume.

Referring to FIG. 2, the pores are formed in various sizes and a size of the pore that occupies a largest volume is a main peak of the pores.

When the pore size and distribution of the ceramic layer are measured by a Hg (mercury) porosimeter, the main peak of the pore may be in the range of 20 nm to 80 nm. If the main peak of the pore is less than 20 nm, the lifetime or the high rate charge/discharge capacity and a low temperature charge/discharge capacity are reduced because movement of lithium ions are interrupted.

A maximum size of the pore of the ceramic layer may be less than 120 nm. If the maximum size of the pore is more than 120 nm, lithium dendrite is easily educed between the pores, and thus the safety of the battery is decreased.

On the other hand, a method of measuring color chromaticity is used for simply analyzing state of the pore of the ceramic layer. The color chromaticity can be measured by obtaining result values of the x, y, Y by using the spectrophotometer of a model No. CM2600D. Here, the x and y indicate color coordinates (CIE chromaticity coordinates), and the Y indicates a reflectivity of light (reflectance).

Values of the color coordinates x and y are obtained by measuring a surface of the ceramic layer using the spectrophotometer and a position of a color of the ceramic layer can be identified by obtaining values of color coordinates corresponding to the values of x and y. For example, because ceramic powders such as alumina ($Al_2O_3$), zirconia ($ZrO_2$), titan oxide ($TiO_2$) or barium titanite ($BaTiO_3$) is white, the values of x and y near a white region in the color coordinate are obtained. If many pores of a large size are distributed in the ceramic layer, lights are too much scattered so that the color of the ceramic layer looks to the naked eye, for example, as white like a color of milk.

Further, If many pores of a small size are distributed in the ceramic layer, that is, if the ceramic layer is densely formed, lights are optically little scattered so that the color of the ceramic layer looks bluish white in color. It is difficult to distinguish objectively and definitely between the milky white and the bluish white with the naked eye. However, when the color chromaticity is measured with the spectrophotometer, even though they look the same white color to the naked eye, it is possible to identify a difference between color coordinates.

Referring to FIG. 3, in the color coordinate, it moves to the values of x and y of blue color (left) rather than red color (right). As a result, the color becomes near red color (right) as the values of x and y are increased, but the color becomes near blue color (left) as the values of x and y are decreased. That is, if the values of x and y move in the white region of the color coordinate to the direction in which the values of x and y are decreased, it can be considered that the ceramic layer is relatively more dense.

A value of the Y indicating a reflectivity represents an extent of lights scattering in comparison with a standard white color stored in the spectrophotometer. The higher value of the Y means the more reflecting lights, and the lower value of the Y means the less reflecting lights, that is, absorption of lights. The Y value of the standard white color for measurement stored in the spectrophotometer CM2600D is about 99. When a certain substance is measured, the lower value of the Y means the more absorption of lights, and the higher value of the Y means the more reflection of lights. If the white ceramic layer is coated on the black active material layer in thin thickness, it represents the Y value of 20 to 80 because the color of the active material layer is shown through.

The thinner the ceramic layer is, the smaller the Y value is because the color of the black active material layer underneath it is shown through. For example, when the ceramic layer is coated in thickness of 4 μm to 10 μm on the active material layer, the Y value is in the range of 40 to 60.

On the other hand, a battery manufactured by an electrode formed of a ceramic layer having each pore condition of Table 1 and a main peak of the pore, a maximum size of the pore, a color chromaticity, a high rate discharge capacity of the battery and eduction state of dendrite under the overcharge of 4.5 V are represented in the Table 1. Here, the main peak of the pore and the maximum size of the pore were measured by a Hg porosimeter, and the color chromaticity was measured by the spectrophotometer of a MODEL CM2600D manufactured by KONICAMINOLTA company. In the table, x and y are color coordinates, and Y indicates reflectivity of light.

TABLE 1

| | Hg porosimeter | | | | battery performance | |
|---|---|---|---|---|---|---|
| | pore size main peak (nm) | Max pore Size (nm) | color chromaticity CM2600D x/y | Y | 3 C discharge capacity (% to 0.5 C) | 4.5 V charge lithium dendrite eduction |
| Comparative example 1 | 60 | 90 | 0.2913/ 0.3133 | 47.44 | 73 | no |
| Comparative example 2 | 60 | 100 | 0.3010/ 0.3209 | 49.19 | 75 | no |
| Comparative example 3 | 60 | 110 | 0.3010/ 0.3210 | 48.91 | 77 | no |
| Comparative example 4 | 60 | 120 | 0.3019/ 0.3214 | 41.19 | 77 | yes |
| Comparative example 5 | 60 | 130 | 0.3050/ 0.3224 | 47.91 | 78 | yes |
| Example 1 | 35 | 70 | 0.3005/ 0.3207 | 53.68 | 83 | no |
| Example 2 | 35 | 80 | 0.2974/ 0.3175 | 36.03 | 80 | no |
| Example 3 | 35 | 90 | 0.3020/ 0.3223 | 55.70 | 82 | no |
| Example 4 | 35 | 100 | 0.3019/ 0.3226 | 51.51 | 81 | no |
| Example 5 | 45 | 70 | 0.3016/ 0.3223 | 52.97 | 85 | no |
| Example 6 | 45 | 80 | 0.3012/ 0.3213 | 54.33 | 86 | no |
| Example 7 | 45 | 90 | 0.3018/ 0.3219 | 57.60 | 87 | no |
| Example 8 | 45 | 100 | 0.3016/ 0.3223 | 52.57 | 88 | no |
| Example 9 | 45 | 110 | 0.2975/ 0.3175 | 35.72 | 89 | no |
| Example 10 | 5 | 100 | 0.3008/ 0.3210 | 54.38 | 50 | no |
| Example 11 | 10 | 100 | 0.2976/ 0.3177 | 36.14 | 55 | no |
| Example 12 | 15 | 100 | 0.3023/ 0.3230 | 55.03 | 57 | no |
| Example 13 | 20 | 100 | 0.3022/ 0.3216 | 41.42 | 60 | no |
| Example 14 | 30 | 100 | 0.3031/ 0.3224 | 48.92 | 78 | no |
| Example 15 | 50 | 100 | 0.3023/ 0.3218 | 45.31 | 79 | no |
| Example 16 | 70 | 100 | 0.3011/ 0.3300 | 56.79 | 80 | no |
| Example 17 | 80 | 105 | 0.3021/ 0.3221 | 59.11 | 89 | no |
| Example 18 | 90 | 110 | 0.3024/ 0.3231 | 54.75 | 90 | no |
| Example 19 | 95 | 115 | 0.3023/ 0.3230 | 55.03 | 89 | no |

The comparative example 1 represents the result that a PE separator, which is a olefin type film separator, is measured by the Hg porosimeter and the high rate discharge capacity of the battery manufactured by using the separator, and the deposition state of lithium on the negative electrode plate of the battery that has been disassembled after overcharge of 4.5 V.

The comparative examples 2 to 5 represent a high rate discharge capacity of a battery that is formed of an electrode on which only a ceramic layer having each pore condition is coated on an negative electrode plate without the PE separator, and the eduction state of lithium on the negative electrode plate of the battery that has been dismantled after overcharge of 4.5 V.

Referring to the comparative examples 2 to 5, if the maximum size of the pore is more than 120 nm, lithium dendrites are educed. Accordingly, if the maximum size of the pore is more than 120 nm, safety of the battery becomes low.

The examples 1 to 19 represent a high rate discharge capacity of a battery that is formed by coating a ceramic layer having each pore condition on an negative electrode plate and drying and polymerizing it, and the eduction state of lithium on the negative electrode plate of the battery that has been dismantled after overcharge of 4.5 V.

If the main peak of the pore is less than 20 nm, the ceramic layer is densely formed. Accordingly, because the pores are almost not formed, the high rate discharge property becomes low. Thus, the main peak of the pore may be in the range of 20 nm to 80 nm for the high rate discharge capacity. The larger size of the pore is, the better the high rate discharge property is, but to the contrary, if the pore becomes larger, lithium dendrites are easily formed in the pore in the case of overcharge, and accordingly, safety becomes low.

The comparative example 5, as compared with the example 1, represents the largest maximum size of the pore of all comparative examples and examples, and the maximum size of the pore is 130 nm. To the contrary, the example 1 represents the smallest maximum size of the pore of 70 nm, likely as the example 5. That is, in the comparative example 5, lithium dendrites that damage the safety may be grown between large pores of 130 nm, resulting in ignition or explosion of the battery. However, in the example 1, because the maximum size of the pore is 70 nm, there is no growth of lithium dendrites.

When 3C high rate charge/discharge is performed, the example 1 represents a high charge/discharge rate of 83%. However, the comparative example 5 represents a low charge/discharge rate of 78%. This is the reason that lithium ions accelerated by the high rate charge/discharge are not injected into the negative electrode active material layer and educed in the form of lithium dendrites between the large pores.

On the other hand, in the comparative example 1, a color chromaticity of the PE separator is not measured solely, but the color chromaticity of the PE separator placed on the negative electrode plate is measured. This is the reason that the PE separator should be measured and compared under condition similar to the ceramic layer coated on the negative electrode plate.

Referring to the comparative examples 2 to 5 and the examples 1 to 19, x value which is a color coordinate of the ceramic layer coated on the negative electrode plate is in the range of 0.2900 to 0.3050, and y value is in the range of 0.3100 to 0.3300. The reflectivity (reflectance) Y value is in the range of 40 to 60.

The surface of the ceramic layer may be embossed so as to absorb the electrolyte better. A gravure coating may be used as a method of embossing the ceramic layer. The gravure coating is a method of coating by staining a gravure roll having a predetermined pattern with a coating solution to be coated.

The gravure roll includes a central metal cylinder, and a synthetic rubber layer formed of synthetic rubber such as polyurethane surrounding the metal cylinder. A predetermined pattern is formed on the synthetic rubber layer and the pattern is stained with ceramic paste and coated on the electrode plate. Accordingly, the pattern of the embossing on the ceramic layer may be changed according to the pattern formed on the surface of the gravure roll. That is, the surface of the ceramic layer may be embossed in various patterns by replacing the synthetic rubber layer of the metal cylinder with other synthetic rubber layer having a different pattern. Accordingly, the surface of the ceramic layer may have any one of a slant line pattern, a lattice pattern, a lozenge pattern or a comb type pattern.

One preferred embodiment of a secondary battery (not shown) including the electrode assembly will be explained in detail below.

The secondary battery includes an electrode assembly, a can for receiving the electrode assembly and a cap assembly for sealing an opened upper end of the can.

The electrode assembly includes a positive electrode plate, a negative electrode plate and a separator that is interposed between the positive electrode and negative electrode plates and wound. Here, the separator may be formed of a ceramic layer coated on at least one surface of the positive electrode plate or negative electrode plate.

A main peak of pore of the ceramic layer may be in the range of 20 nm to 80 nm. In this time, the maximum size of the pore may be less than 120 nm. Further, the surface of the ceramic layer may be embossed in any one of a slant line pattern, a lattice pattern, a lozenge pattern or a comb type pattern.

On the other hand, the can and cap assembly have general conventional constructions of a secondary battery, and are therefore not illustrated.

That is, the can is formed of aluminum or aluminum alloy having a roughly rectangular shape. The electrode assembly is received through an opened upper end of the can so that the can functions as a container of the electrode assembly and electrolyte. In addition, the can perform a terminal by itself.

The cap assembly includes a flat type cap plate having a size and a shape corresponding to the opened upper end of the can. Here, a tube-shaped gasket is provided between the cap plate and an electrode terminal passing through a center part of the cap plate for electrical insulation. An insulation plate is arranged on a lower surface of the cap plate, and a terminal plate is installed on a lower surface of the insulation plate. A lower surface of the electrode terminal is electrically coupled to the terminal plate. A positive electrode tap withdrawn from a positive electrode plate is welded on the lower surface of the cap plate, and a negative electrode tap withdrawn from a negative electrode plate is welded on a lower end of the electrode terminal with a zigzag-shaped bent part.

An electrolyte injection hole is formed on one side of the cap plate, and a stopper is installed so as to seal the electrolyte injection hole after the electrolyte has been injected into the can. The stopper is formed by mechanically pressing a ball-shaped host material made of aluminum or aluminum containing metal on the electrolyte injection hole. The stopper is welded to the cap plate at a periphery of the electrolyte injection hole so as to seal it. The cap assembly is combined with the can by welding a peripheral part of the cap plate to a side wall of a can opening.

Operations of the electrode assembly and the secondary battery including the same will be explained below.

The electrode assembly includes the positive electrode plate, the negative electrode plate and the separator interposed between the positive electrode and negative electrode plates for preventing an electrical short, where the separator is formed of the ceramic layer coated on at least one surface of the positive electrode plate or negative electrode plate.

The main peak of the pore of the ceramic layer is in the range of 20 nm to 80 nm and the maximum size of the pore is less than 120 nm so that the pore size and distribution are optimized.

Accordingly, the lifetime, the high rate charge/discharge capacity and the low temperature charge/discharge capacity of the battery are improved without eduction of lithium dendrite between the pores. In addition, because the surface of the ceramic layer is embossed, the electrolyte injection speed is increased and the ceramic layer absorbs the electrolyte existing in a periphery of the jelly-roll and maintains it between the positive electrode and negative electrode layers, thereby improving the cycle property.

As described above, the electrode assembly and the secondary battery including the same according to the present invention produces the following effect.

The safety of the ceramic layer is improved and the lifetime and high rate charge/discharge capacity and the low temperature charge/discharge capacity of the battery are enhanced by optimizing the pore size and distribution and embossing the surface of the ceramic layer.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. An electrode assembly comprising a positive electrode plate and an negative electrode plate, comprising
   a porous ceramic layer coated on at least one of the positive electrode plate or the negative electrode plate to prevent an electrical short between the positive electrode plate and the negative electrode plate, wherein
   the porous ceramic layer comprises an inorganic oxide filler and a polymeric binder;
   a main peak of a pore size of the porous ceramic layer is in the range of 30 nm to 95 nm, and the main peak is a size of a pore that occupies a largest volume on a pore distribution curve; and
   a maximum size of a pore of the porous ceramic layer is in the range of 70 nm to 115 nm.

2. The electrode assembly of claim 1, wherein when the porous ceramic layer is measured by a spectrophotometer, a value of a chromaticity coordinate x is in the range of 0.2900 to 0.3050 and a value of a chromaticity coordinate y is in the range of 0.3100 to 0.3300.

3. The electrode assembly of claim 2, wherein when the porous ceramic layer is measured by a spectrophotometer, a value of a reflectance Y is in the range of 40 to 60.

4. The electrode assembly of claim 1, wherein a surface of the porous ceramic layer is embossed.

5. The electrode assembly of claim 4, wherein the surface of the porous ceramic layer has any one of a slant line pattern, a lattice pattern, a lozenge pattern or a comb type pattern.

6. The electrode assembly of claim 1, wherein the porous ceramic layer is formed by coating on the positive electrode plate or the negative electrode plate with a ceramic paste formed by mixing an inorganic oxide filler with a binder and a solvent.

7. The electrode assembly of claim 6, wherein the inorganic oxide filler is a semiconductor filler having a band gap.

8. The electrode assembly of claim 6, wherein the binder is an acrylate rubber group binder.

9. The electrode assembly of claim 1, wherein thickness of the porous ceramic layer is in the range of 1 µm to 20 µm.

10. A secondary battery comprising an electrode assembly, a can and a cap assembly, comprising
 a porous ceramic layer coated on at least one surface of two electrode plates included in the electrode assembly to prevent an electrical short between the two electrode plates, wherein
 the porous ceramic layer comprises an inorganic oxide filler and a polymeric binder;
 a main peak of a pore size of the porous ceramic layer is in the range of 30 nm to 95 nm, and the main peak is a size of a pore that occupies a largest volume on a pore distribution curve; and
 the maximum size of the pore of the porous ceramic layer is in the range of 70 nm to 115 nm.

11. The secondary battery of claim 10, wherein a surface of the porous ceramic layer is embossed so as to have any one of a slant line pattern, a lattice pattern, a lozenge pattern or a comb type pattern.

* * * * *